United States Patent
Kim et al.

(10) Patent No.: US 7,995,848 B2
(45) Date of Patent: Aug. 9, 2011

(54) METHOD AND APPARATUS FOR ENCODING AND DECODING IMAGE DATA

(75) Inventors: Wooshik Kim, Yongin-si (KR); Shinwa Lee, Seoul (KR); Daesung Cho, Seoul (KR); Sangjo Lee, Suwon-si (KR); Dmitri Birinov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 880 days.

(21) Appl. No.: 11/302,142

(22) Filed: Dec. 14, 2005

(65) Prior Publication Data

US 2006/0146930 A1   Jul. 6, 2006

(30) Foreign Application Priority Data

Jan. 5, 2005   (KR) .................. 10-2005-0000830

(51) Int. Cl.
 *G06K 9/36* (2006.01)
 *G06K 9/46* (2006.01)
(52) U.S. Cl. .................................................. 382/238
(58) Field of Classification Search .................. None
 See application file for complete search history.

(56) References Cited

U.S. PATENT DOCUMENTS

| | | | | |
|---|---|---|---|---|
| 4,371,895 A * | 2/1983 | Koga | | 375/240.14 |
| 4,460,923 A * | 7/1984 | Hirano et al. | | 348/413.1 |
| 5,034,965 A * | 7/1991 | Kato | | 375/243 |
| 5,262,854 A * | 11/1993 | Ng | | 375/240.24 |
| 5,280,545 A * | 1/1994 | Masuda | | 382/284 |
| 5,566,254 A * | 10/1996 | Murata et al. | | 382/304 |
| 5,608,864 A * | 3/1997 | Bindlish et al. | | 345/558 |
| 5,854,857 A * | 12/1998 | de Queiroz et al. | | 382/232 |
| 6,078,687 A * | 6/2000 | Venkateswar | | 382/169 |
| 6,148,109 A * | 11/2000 | Boon et al. | | 382/238 |
| 6,269,193 B1 * | 7/2001 | Young et al. | | 382/244 |
| 6,341,144 B1 * | 1/2002 | Haskell et al. | | 375/240.2 |
| 6,556,625 B2 * | 4/2003 | Haskell et al. | | 375/240.2 |
| 6,563,953 B2 * | 5/2003 | Lin et al. | | 382/233 |
| 6,907,142 B2 * | 6/2005 | Kalevo et al. | | 382/238 |
| 7,209,105 B2 * | 4/2007 | Elliott | | 345/89 |
| 7,249,153 B2 * | 7/2007 | Cheng et al. | | 708/203 |
| 7,295,713 B2 * | 11/2007 | Kalevo et al. | | 382/238 |
| 7,305,139 B2 * | 12/2007 | Srinivasan et al. | | 382/248 |

(Continued)

OTHER PUBLICATIONS

Christopoulos et al, "The JPEG2000 Still Image Coding System: An Overview", IEEE Trans. Consumer Electronics, vol. 46, No. 4, Nov. 2000, pp. 1104-1127.*

*Primary Examiner* — Yuzhen Ge
(74) *Attorney, Agent, or Firm* — Staas & Halsey LLP

(57) ABSTRACT

A method and apparatus for encoding and decoding image data. The method of encoding image data includes spatially predicting pixel values of a one-dimensional block of an image using blocks spatially adjacent to the one-dimensional block or temporally predicting the pixel values of the one-dimensional block using a temporally previous frame; transforming and quantizing the pixel values of the one-dimensional block; and generating bit streams for a one-dimensional conversion block when the transformed and quantized one-dimensional block is defined as the one-dimensional conversion block. Therefore, since the method and apparatus encode and decode image data in one-dimensional block units, real-time encoding and decoding can be achieved. In addition, compression efficiency can be enhanced while minimizing visual degradation of image quality.

42 Claims, 9 Drawing Sheets

U.S. PATENT DOCUMENTS

| | | | |
|---|---|---|---|
| 7,433,532 B2 * | 10/2008 | Truitt et al. | 382/254 |
| 2001/0017942 A1 * | 8/2001 | Kalevo et al. | 382/238 |
| 2003/0160748 A1 * | 8/2003 | Kimura | 345/87 |
| 2003/0164975 A1 * | 9/2003 | Aoyagi et al. | 358/1.15 |
| 2004/0184766 A1 * | 9/2004 | Kim et al. | 386/46 |

* cited by examiner

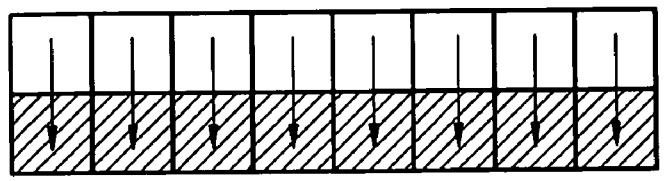
FIG. 4A
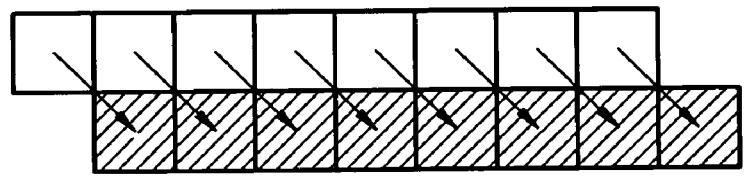
FIG. 4B
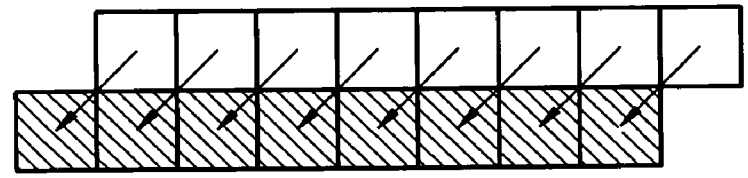
FIG. 4C
FIG. 5
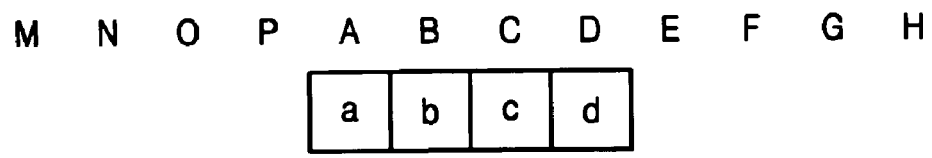
FIG. 6
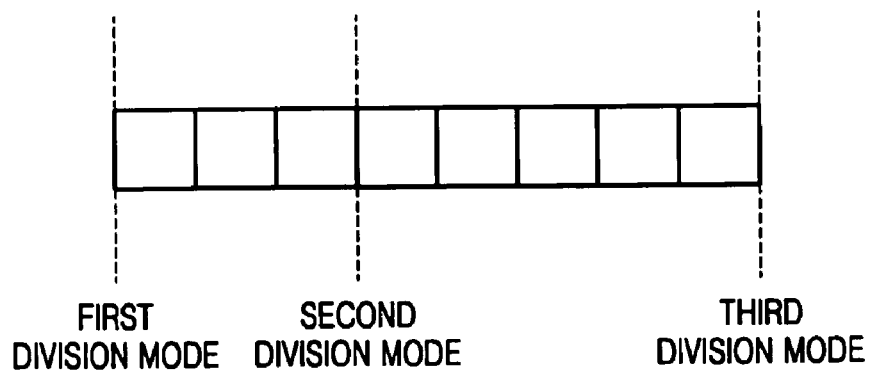

FIRST DIVISION MODE

SECOND DIVISION MODE

SECOND DIVISION MODE

THIRD DIVISION MODE

METHOD AND APPARATUS FOR ENCODING AND DECODING IMAGE DATA

CROSS-REFERENCE TO RELATED APPLICATIONS

This application claims the priority of Korean Patent Application No. 10-2005-0000830, filed on Jan. 5, 2005, in the Korean Intellectual Property Office, the disclosure of which is incorporated herein by reference.

BACKGROUND OF THE INVENTION

1. Field of the Invention

The present invention relates to image compression, and more particularly, a method and an apparatus for encoding and decoding image data, which can enhance compression efficiency while hardly suffering from visual degradation of image quality

2. Description of Related Art

Conventionally, an image has been encoded through the processes of predicting the image in terms of time and space, encoding an RGB signal of the predicted image, converting/quantizing the encoded RGB signal, and generating bit streams for coefficients of the converted/quantized image. When encoding an image, predictive encoding is performed for each color component, i.e., R (red), G (green), and B (blue). The RGB color components in an image are considered separately, predictively encoded, and compressed.

After being separately encoded, the encoded RGB color components, i.e., RGB signal, are orthogonally transformed and quantized. The orthogonal transform and quantization is one kind of high-efficiency encoding method of image signals or voice signals. In the orthogonal transform and quantization, an input signal is divided into blocks of an appropriate size and each of the blocks is orthogonally transformed. The orthogonal transform and quantization is a method of compressing data by reducing the total number of bits. To reduce the total number of bits, different numbers of bits are assigned to the R, G and B components according to the size of power of the transformed R, G and B signal components, and then the R, G and B components are quantized.

According to the conventional art, image data input in line units is divided into two-dimensional blocks (for example, 4×4 blocks or 8×8 blocks), and then the two-dimensional blocks are encoded and decoded. Since the encoding and decoding of the image data are performed after two-dimensional blocks are formed, there are limitations on performing real-time encoding and decoding. For example, a 4×4 block can be formed only after inputs of four rows of the 4×4 block are received. When encoding the 4×4 block, three rows are stored in a buffer, and a first row is encoded when a fourth row is input. In this process, encoding time can be delayed. Conversely, when decoding the 4×4 block, an output of one row can be displayed only after all rows of the 4×4 block are decoded. Thus, the process of storing three rows in the buffer is required and time delay is inevitable.

In addition, when performing conventional spatial prediction using pixel values of blocks adjacent to a current block, the conventional spatial prediction is performed using pixel values of blocks on the left of the current block. Hence, it is impossible to perform real time spatial prediction and encoding. In other words, the spatial prediction of the current block using the pixel values of the blocks on the left of the current block can be performed using pixel values of restored blocks adjacent to the current block after performing the spatial prediction, conversion and quantization, inverse quantization and inverse conversion, and spatial prediction compensation on blocks adjacent to the current block. If the pixel values of the blocks on the left of the currents block are used, pipeline processing is not performed, thereby making it impossible to encode and decode image data in real time.

If the R, G and B components are separately encoded, redundant information of the RGB components is redundantly encoded, resulting in a decrease in encoding efficiency.

In this regard, the conventional encoding method reduces compression efficiency of an image and deteriorates image quality.

BRIEF SUMMARY

An aspect of the present invention provides a method of encoding and decoding image data for encoding and decoding the image data in one-dimensional block units.

An aspect of the present invention also provides an apparatus for encoding and decoding image data for encoding and decoding the image data in one-dimensional block units.

According to an aspect of the present invention, there is provided a method for encoding image data, the method including: spatially predicting pixel values of a one-dimensional block of an image using blocks spatially adjacent to the one-dimensional block or temporally predicting the pixel values of the one-dimensional block using a temporally previous frame; transforming and quantizing the pixel values of the one-dimensional block; and generating bit streams for a one-dimensional conversion block when the transformed and quantized one-dimensional block is defined as the one-dimensional conversion block.

According to another aspect of the present invention, there is provided a method for decoding image data, the method including: decoding information of bit streams for coefficients of a one-dimensional conversion block when a converted and quantized one-dimensional block is defined as the one-dimensional conversion block; inversely quantizing and inversely transforming the coefficients of the decoded one-dimensional conversion block; and compensating for spatially or temporally predicted pixel values of the inversely quantized and inversely transformed one-dimensional block.

According to another aspect of the present invention, there is provided an apparatus for encoding image data, the apparatus including: a temporal/spatial predictor spatially predicting pixel values of a one-dimensional block of an image using blocks spatially adjacent to the one-dimensional block or temporally predicting the pixel values of the one-dimensional block using a temporally previous frame; a transformer and quantizer transforming and quantizing the pixel values of the one-dimensional block; a first inverse quantizer and inverse transformer inversely quantizing and inversely transforming a one-dimensional conversion block when the transformed and quantized one-dimensional block is defined as the one-dimensional conversion block; a first temporal/spatial prediction compensator compensating for the spatially or temporally predicted pixel values; and a bit stream generator generating bit streams for the one-dimensional conversion block.

According to another aspect of the present invention, there is provided an apparatus for decoding image data, the apparatus including: a coefficient decoder decoding information of bit streams for coefficients of a one-dimensional conversion block when a converted and quantized one-dimensional block is defined as the one-dimensional conversion block; a second inverse quantizer and inverse transformer inversely quantizing and inversely transforming the coefficients of the decoded one-dimensional conversion block; and a second temporal/spatial prediction compensator compensating for spatially or temporally predicted pixel values of the inversely quantized and inversely transformed one-dimensional block.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIGS. 4A through 4C illustrate examples of prediction directions of an 8×1 block, which corresponds to a one-dimensional block;

FIG. 5 illustrates an example of pixel values of a 4×1 one-dimensional block and pixel values of blocks in a row above a row where the 4×1 one-dimensional block is;

FIG. 6 illustrates three types of division mode dividing an 8×1 one-dimensional conversion block;

DETAILED DESCRIPTION OF EMBODIMENTS

Figure 1:
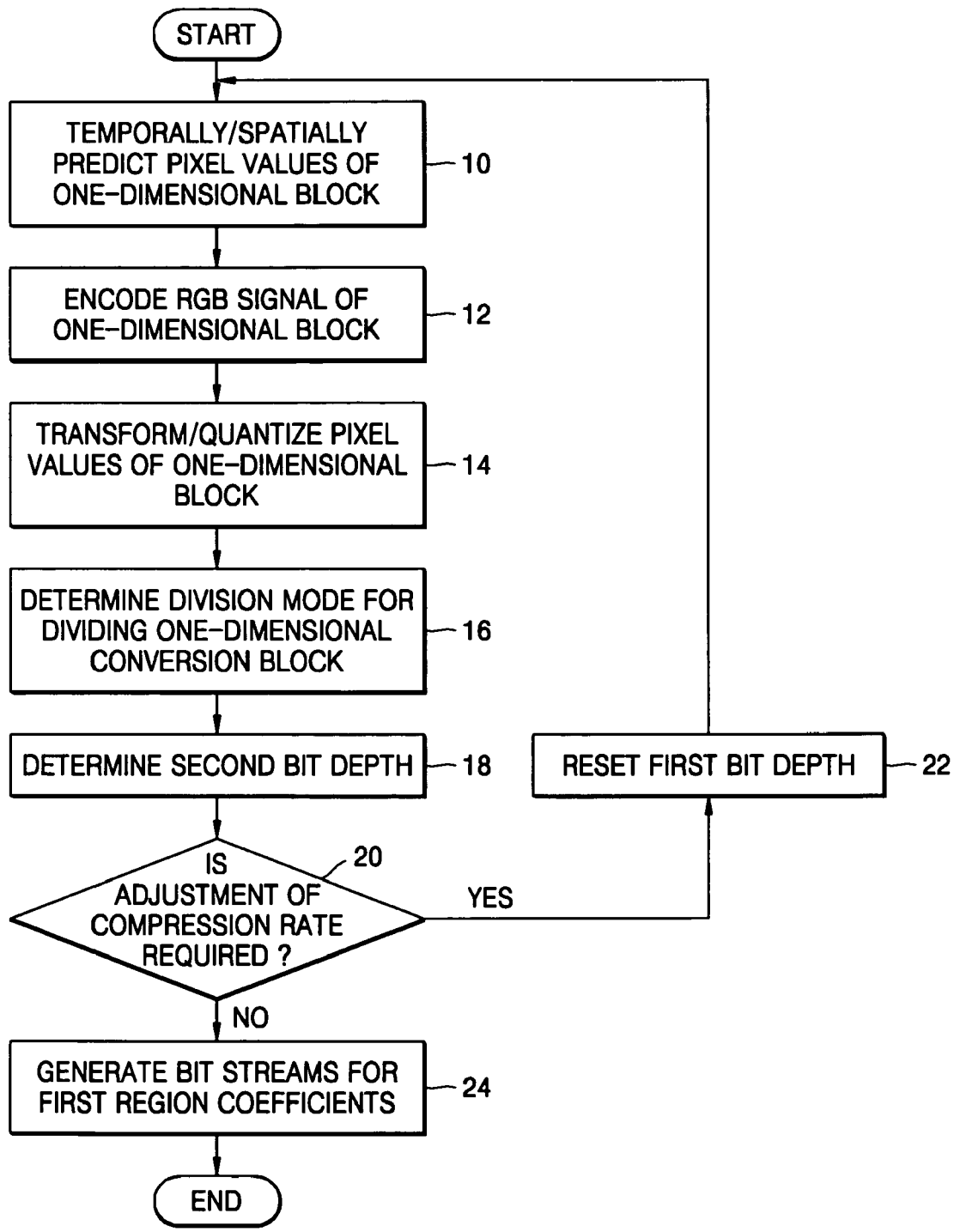
FIG. 1 is a flowchart illustrating a method of encoding image data according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a method of encoding image data according to an embodiment of the present invention. Referring to FIG. 1, pixel values of a one-dimensional block are spatially predicted using blocks adjacent to the one-dimensional block or pixel values of a one-dimensional block are temporally predicted using a previous frame (operation 10).

Figure 2A:
FIGS. 2A and 2B illustrate examples of one-dimensional blocks.
Figure 2B:

FIGS. 2A and 2B illustrate examples of one-dimensional blocks. FIG. 2A indicates an 8×1 one-dimensional block, and FIG. 2B indicates a 4×1 one-dimensional block. Referring to FIGS. 2A and 2B, the 8×1 one-dimensional block and the 4×1 one-dimensional block are obtained by dividing image data, which is input in line units, in 8 pixel units and 4 pixel units, respectively. The image data input in line units may also be divided into one-dimensional blocks in various pixel units.

The process of removing spatial redundancy of a one-dimensional block using blocks spatially adjacent to the one-dimensional block is called spatial prediction (referred to as intra prediction). The process of removing temporal redundancy of a one-dimensional block using a previous frame that temporally precedes a current frame of the one-dimensional block is called temporal prediction (referred to as inter prediction). In other words, spatially predicted pixel values are obtained by estimating a prediction direction based on blocks spatially adjacent to a current block for each RGB color component. Also, temporally predicted pixel values are obtained by estimating a motion between a current block and a previous frame for each RGB color component.

In particular, the spatial prediction of a one-dimensional block is performed using only pixel values of blocks in a row above a row where the one-dimensional block is.

Figure 3:
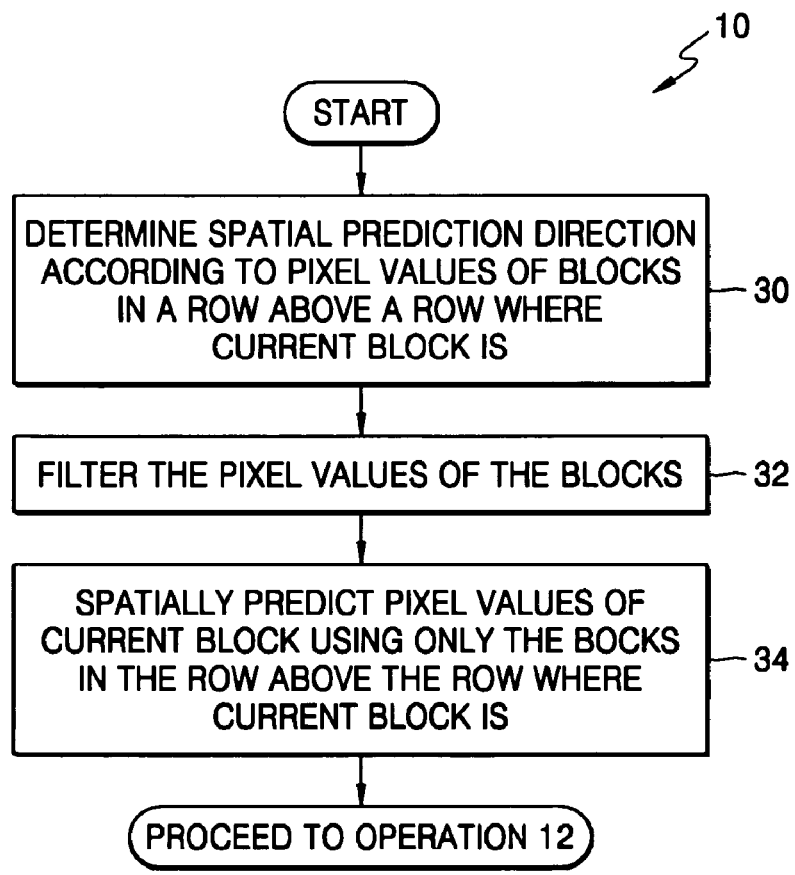
FIG. 3 is a flowchart illustrating a method of spatially predicting a one-dimensional block using only pixel values of blocks in a row above a row where the one-dimensional block is according to an embodiment of the present invention.

FIG. 3 is a flowchart illustrating a method of spatially predicting a one-dimensional block using only pixel values of blocks in a row above a row where the one-dimensional block is according to an embodiment of the present invention. Referring to FIG. 3, a spatial prediction direction is determined using pixel values of blocks in a row above a row where a one-dimensional block is (operation 30).

FIGS. 4A through 4C illustrate examples of prediction directions of an 8×1 block, which corresponds to a one-dimensional block. FIG. 4A illustrates a vertical spatial prediction direction of the 8×1 block. FIG. 4B illustrates a right diagonal spatial prediction direction of the 8×1 block. FIG. 4C illustrates a left diagonal spatial prediction direction of the 8×1 block. The spatial prediction directions of the one-directional block illustrated in FIGS. 4A through 4C are just examples. Various spatial prediction directions may also be suggested.

FIG. 5 illustrates an example of pixel values of a 4×1 one-dimensional block and pixel values of blocks in a row above a row where the 4×1 one-dimensional block is. Four methods of determining a spatial prediction direction using pixel values of blocks adjacent to the 4×1 one-dimensional block will now be described.

In a first method, sums of differences between pixel values of the 4×1 one-dimensional block and pixel values of a block in the above row where the 4×1 one-dimensional block is are calculated for the respective RGB components in each direction. Among the sums of the differences, a direction having a minimum sum is determined as the spatial prediction direction.

In a vertical direction, the differences between the pixel values of the 4×1 one-dimensional block and the pixel values of the block in the above row where the 4×1 one-dimensional block exists are a'=a−A, b'=b−B, c'=c−C, and d'=d−D, respectively. It is assumed that sums of the differences in the vertical direction for the RGB components are $S_1$, $S_2$, and $S_3$, respectively.

In a right diagonal direction, the differences between the pixel values of the 4×1 one-dimensional block and the pixel values of the block in the above row where the 4×1 one-dimensional block exists are a'=a−P, b'=b−A, c'=c−B, and d'=d−C, respectively. It is assumed that sums of the differences in the right diagonal direction for the R, G and B components are $S_4$, $S_5$, and $S_6$, respectively.

In a left diagonal direction, the differences between the pixel values of the 4×1 one-dimensional block and the pixel values of the block in the above row where the 4×1 one-dimensional block exists are a'=a−B, b'=b−C, c'=c−D, and d'=d−E, respectively. It is assumed that sums of the differences in the left diagonal direction for the R, G and B components are $S_7$, $S_8$, and $S_9$, respectively.

Prediction directions having minimum sums for the R, G and B components are determined as spatial prediction directions for the R, G and B components, respectively. In other words, a prediction direction having a minimum value among $S_1$, $S_4$, and $S_7$ is determined as the prediction direction for the component R. Likewise, a prediction direction having a minimum value among $S_2$, $S_5$, and $S_8$ is determined as the prediction direction for the component G. A prediction direction having a minimum value among $S_3$, $S_6$, and $S_9$ is determined as the prediction direction for the component B.

In a second method, the sums of the differences between the pixel values of the 4×1 one-dimensional block and the pixel values of the block in the above row where the 4×1 one-dimensional block is and a direction determination value in consideration of a compression rate for each direction are calculated. A direction having a minimum value among the calculated direction determination values is determined as a spatial prediction direction. Direction determination values are calculated using the following equation $$C = D + \lambda R, \quad (1)$$

where C denotes a direction determination value for each direction, D denotes a sum of differences between pixel values of a current block and pixel values of a block adjacent to the current block for each direction, λ denotes a predetermined constant value, and R denotes a compression rate for each direction.

In a third method, the sums of the differences between the pixel values of the 4×1 one-dimensional block and the pixel values of the block in the above row where the 4×1 one-dimensional block is are calculated for the respective R, G and B components. Then, sums of the sums of the differences for the R, G and B components are calculated, and a prediction direction having a minimum sum among the sums of the sums of the differences is determined as a direction for spatial prediction.

For example, as illustrated in FIG. 5, it is assumed that the sums of the differences between the pixel values of the 4×1 one-dimensional block and the pixel values of the block in the above row where the 4×1 one-dimensional block is for the respective R, G and B components are $S_1$, $S_2$, $S_3$, $S_4$, $S_5$, $S_6$, $S_7$, $S_8$, and $S_9$. Since the sums of the differences for the R, G and B components in the vertical direction are $S_1$, $S_2$, and $S_3$, respectively, a sum of $S_1$, $S_2$, and $S_3$ is $S_V = S_1 + S_2 + S_3$. Also, since the sums of the differences for the R, G and B components in the right diagonal direction are $S_4$, $S_5$, and $S_6$, respectively, a sum of $S_4$, $S_5$, and $S_6$ is $S_R = S_4 + S_5 + S_6$. Also, since the sums of the differences for the R, G and B components in the left diagonal direction are $S_7$, $S_8$, and $S_9$, respectively, a sum of $S_7$, $S_8$, and $S_9$ is $S_L = S_7 + S_8 + S_9$. A prediction direction having a minimum sum among the sums ($S_V$, $S_R$, and $S_L$) is determined as a spatial prediction direction.

When calculating a sum of the sums of the differences for the respective R, G and B components, a different weight may be given to each of the R, G and B components. For example, when $S_1$ is a sum of the differences between the pixel values of the 4×1 one-dimensional block and the pixel values of the block in the above row where the 4×1 one-dimensional block is for the component R, $S_2$ is a sum of the differences for the component G, and $S_3$ is a sum of the differences for the component B, a sum of $S_1$, $S_2$, and $S_3$ may be calculated by applying different weights to $S_1$, $S_2$, and $S_3$. In other words, the sum of $S_1$, $S_2$, and $S_3$ may be $S_V = 0.3 \square S_1 + 0.6 \square S_2 + 0.1 \square S_3$. The reason why different weights are given to $S_1$, $S_2$, and $S_3$ is that the processing of the component G is important to an image. The weights described above are merely examples, and various weights can be applied to $S_1$, $S_2$, and $S_3$.

In a fourth method, the sums of the differences between the pixel values of the 4×1 one-dimensional block and the pixel values of the block in the above row where the 4×1 one-dimensional block is are calculated for the respective R, G and B components, and a direction determination value is calculated in consideration of a compression rate for each direction. A direction having a minimum value among the calculated direction determination values is determined as a spatial prediction direction. Direction determination values are calculated using Equation 1 described above.

Referring to FIG. 3, after operation 30, the pixel values of the blocks in the above row where the one-dimensional block is are filtered (operation 32). Such filtering is required to prevent degradation of image quality caused by the spatial prediction performed using only the pixel values of the blocks in the above row where the one-dimensional block is.

A filtering method will now be described with reference to FIG. 5. If the vertical direction is determined as the spatial prediction direction, a pixel value A, which is used for the spatial prediction, is filtered using an average value of pixel values adjacent to the right and left of the pixel value A. For example, one of pixel values (P+B)/2, (P+2A+B)/4, (2O+3P+6A+3B+2C)/16, and etc. is used as the pixel value A for the spatial prediction. Similarly, one of pixel values (A+C)/2, (A+2B+C)/4, (2P+3A+6B+3C+2D)/16, and etc. is used as the pixel value B for the spatial prediction.

Other pixel values of the blocks in the above row where the one-dimensional block is are also filtered as described above. The filtering method described above is just an example, and pixel values of more adjacent blocks may be used in the filtering process.

Referring to FIG. 3, after operation 32, the pixel values of the one-dimensional block are spatially predicted using only the blocks in the above row where the one-dimensional block is (operation 34). The pixel values of the one-dimensional block are predicted in one of the vertical direction, the right diagonal direction, and the left diagonal direction determined in operation 30.

As shown in FIGS. 4A through 4C, FIG. 4A illustrates the vertical spatial prediction direction of the 8×1 block. FIG. 4B illustrates the right diagonal spatial prediction direction of the 8×1 block. FIG. 4C illustrates the left diagonal spatial prediction direction of the 8×1 block. A variety of spatial prediction directions may be employed in addition to the spatial prediction directions of the 8×1 one-dimensional block shown in FIGS. 4A through 4C.

Referring to FIG. 1, after operation 10, redundant information is removed from the spatially predicted pixel values of the one-dimensional block for the R, G and B components, and an RGB signal having the redundant information removed is encoded (operation 12). When pixel values of a RGB image are spatially predicted for each of the R, G and B components, redundant information is removed using the correlation between the spatially predicted pixel values for the R, G and B components, and a RGB signal without the redundant information is encoded. When pixel values of a RGB image are temporally predicted for each of the R, G and B components, redundant information is removed using the correlation between the temporally predicted pixel values for the R, G and B components, and a RGB signal without the redundant information is encoded.

After operation 12, the pixel values of the one-dimensional block are transformed/quantized (operation 14). Orthogonal transform encoding is used to transform the pixel values of the one-dimensional block. In the orthogonal transform encoding, it is known to use a fast Fourier transform (FFT), a discrete cosine transform (DCT), a Karhunen-Loeve transform (KLT), a Hadamard transform, and a slant transform.

In particular, the Hadamard transform may be usable in the present invention. In the Hadamard transform, a Hadamard matrix composed of +1 and −1 is used to transform pixel values.

After operation 14, when the transformed/quantized one-dimensional block is defined as a one-dimensional conversion block, a division mode for dividing the one-dimensional conversion block into a first region where at least one of the coefficients of the one-dimensional conversion block is not "0" and a second region where all of the coefficients are "0" is determined (operation 16).

The division mode is for dividing the one-dimensional conversion block into a region where the coefficients of the one-dimensional conversion block are "0" and a region where the coefficients of the one-dimensional conversion block are not "0."

FIG. 6 illustrates three types of division mode dividing an 8×1 one-dimensional conversion block. Referring to FIG. 6, first through third division modes in the 8×1 one-dimensional conversion block are indicated by dotted lines. Positions of the first through third division modes indicated by the dotted lines in FIG. 6 are just examples and may change.

Figure 7A:
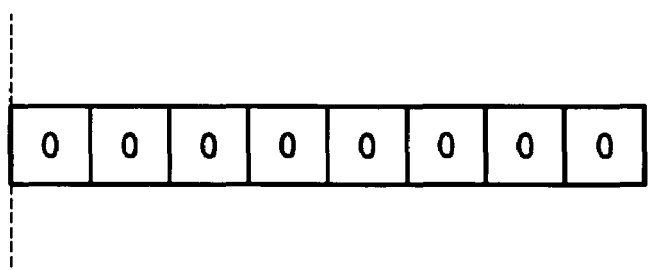
FIGS. 7A through 7D illustrate examples of a first through a third division modes of FIG. 6 determined according to coefficients.

FIGS. 7A through 7D illustrate examples of the first through third division modes of FIG. 6 determined according to coefficients. Referring to FIG. 7A, the position of the dotted line of the first division mode is at the far left of a one-dimensional conversion block. Such a mode is generally called a skip mode. In this mode, the first region where at least one of the coefficients is not "0" does not exist, and only the second region where all of the coefficients are "0" exists. Therefore, if all of the coefficients of the one-dimensional conversion block are "0," the type of division mode is determined as the first division mode.

Figure 7B:
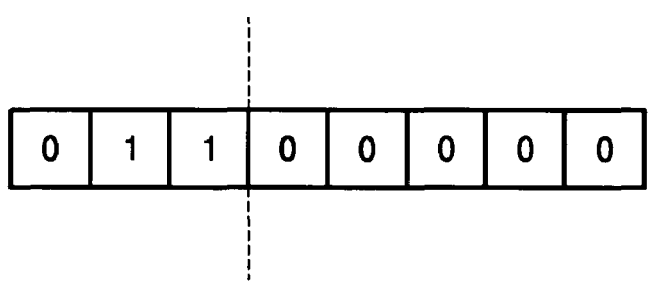

Referring to FIG. 7B, the position of the dotted line of the second division mode is between third and fourth coefficients of a one-dimensional conversion block. In this mode, the first region where at least one of the coefficients is not "0" exists and the second region where all of the coefficients are "0" also exists. Therefore, if all of the coefficients on the right of the second division mode indicated by the dotted line in the one-dimensional conversion block are "0," the type of division mode is determined as the second division mode.

Figure 7C:
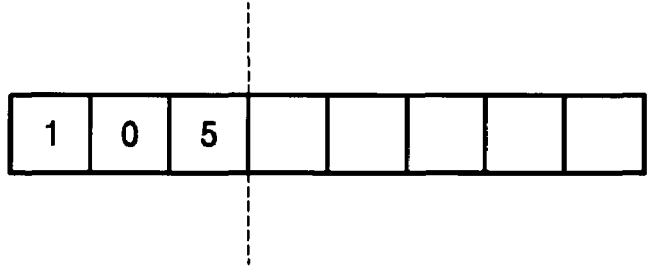
Figure 7D:
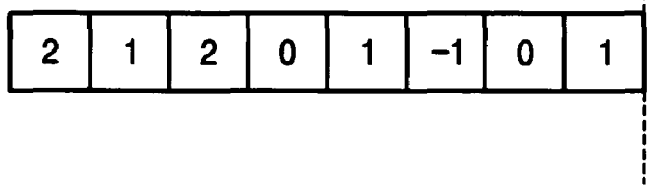

FIG. 7C illustrates another example of the second division mode. Referring to FIG. 7D, the position of the dotted line of the third division mode is at the far right of a one-dimensional conversion block. In this mode, the first region where at least one of the coefficients is not "0" exists and the second region where all of the coefficients are "0" does not exist. Therefore, if all of the coefficients on the right of the dotted line of the third division mode in the one-dimensional conversion block are "0," the type of division mode is determined as the third division mode.

After operation 16 of FIG. 1, a second bit depth indicating the number of bits used to binarize coefficients of the first region is determined based on whether all of the coefficients of the first region are within a predetermined range.

A bit depth refers to the number of bits used to store information regarding each pixel in computer graphics. Thus, the second bit depth denotes the number of bits used to binarize coefficients of the first region. A range of coefficients is pre-determined.

Table 1 below is a lookup table that shows the second bit depth determined according to a range of coefficients.

TABLE 1

| Division Mode Identification Information | Predetermined Range of Coefficients of First Region | Second Bit Depth |
| --- | --- | --- |
| 1 | −4 through 3 | 3 |
| 2 | −8 through 7 | 4 |

If it is assumed that the division mode identification information in Table 1 indicates identification information of each of the second and third division modes in an 8×1 one-dimensional conversion block, the identification information of the second division mode is "1" and the identification information of the third division mode is "2." The first division mode, i.e., the skip mode, is not shown in Table 1.

Figure 8:
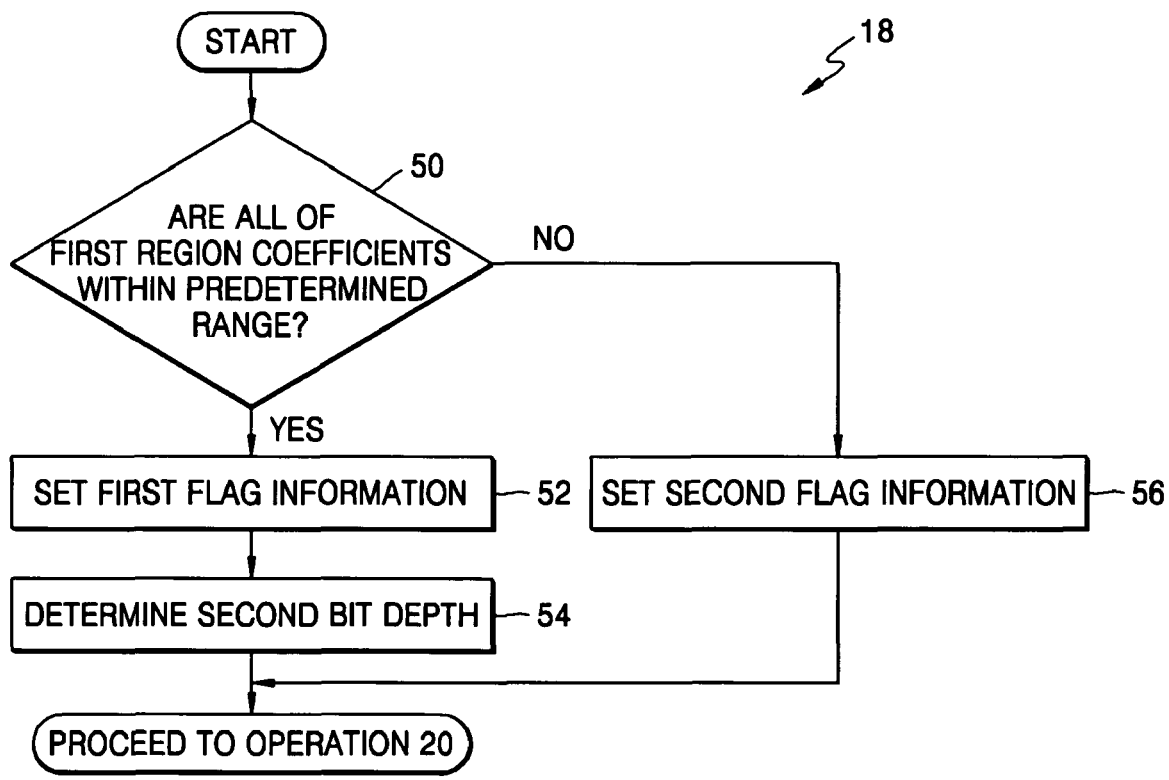
FIG. 8 is a flowchart illustrating operation 18 of FIG. 1 according to an embodiment of the present invention.

Referring to FIG. 1, the depth of the second bit is determined. FIG. 8 is a flowchart illustrating operation 18 of FIG. 1 according to an embodiment of the present invention. Referring to FIG. 8, it is determined whether all of coefficients of the first region are within a predetermined range (operation 50). For example, it is assumed that a predetermined range of coefficients of the first region is "−4 through 3" as shown in Table 1 and that a division mode determined in operation 16 is the second division mode (here, it is assumed that the identification information of the second division mode is "1"). It is determined whether the coefficients of the first region of the second division mode are within the predetermined range of "−4 through 3."

If it is determined that all of the coefficients of the first region are within the predetermined range, first flag information indicating that all of the coefficients of the first region are within the predetermined range is set (operation 52).

FIG. 7B illustrates an example of the second division mode. Referring to FIG. 7B, all of the coefficients of the first region based on the position of the dotted line of the second division mode corresponding to a low-frequency signal are within the range of "−4 through 3." The first flag information indicates that all of the coefficients of the first region are within the range of "−4 through 3." Since the first flag information can be expressed as a binarized bit stream using any one of "0" or "1," 1 bit is assigned to binarize the first flag information.

After operation 52, the second bit depth is determined in response to the set first flag information (operation 54). The second bit depth may be determined according to the type of division mode. For example, if the first flag information is set, "3 bits," which correspond to the second division mode whose identification mode is "1" (see Table 1), is determined as the second bit depth. A specific bit depth may be determined as the second bit depth regardless of the type of division mode.

In operation 50, if at least one of the coefficients of the first region is not within the predetermined range, second flag information indicating that at least one of the coefficients of the first region is not within a predetermined range is set (operation 56). For example, it is assumed that the predetermined range of the coefficients of the first region is "−4 through 3" as shown in Table 1 and that a division mode determined in operation 16 is the second division mode (here, it is assumed that the identification information of the second division mode is "1").

Referring to FIG. 7C, not all of the coefficients of the first region based on the position of the dotted line of the second division mode, which correspond to a low-frequency signal, are within the range of "−4 through 3." In other words, since the third coefficient among the coefficients of the first region is "5," the third coefficient is not within the range of "−4 through 3." The second flag information indicates that not all of the coefficients of the first region are within the range of "−4 through 3." Since the second flag information can be expressed as a binarized bit stream using any one of "0" or "1," 1 bit is assigned to binarize the second flag information. If the first flag information is expressed as a bit stream of "1," the second flag information is expressed as a bit stream of "0."

Referring to FIG. 1, after operation 18, a need for adjusting a compression rate of the one-dimensional conversion block is identified (operation 20). If the need for adjusting the compression rate of the one-dimensional conversion block is identified, first bit depth is reset and operation 10 is performed (operation 22). The first bit depth denotes the number of bits used to binarize coefficients of a one-dimensional conversion block. The first bit depth is reset using a quantization adjustment value for adjusting a quantization interval.

Table 2 below shows first bit depths corresponding to quantization adjustment values.

TABLE 2

| First Bit Depth [1 Bit] | Quantization Adjustment Value |
|---|---|
| 12 | 0 |
| 11 | 6 |
| 10 | 12 |
| 9 | 18 |
| 8 | 24 |
| 7 | 30 |
| 6 | 36 |

As shown in Table 2, the greater the quantization value, the smaller the first bit depth. A small first bit depth denotes that a small number of bits are used to binarize coefficients of a one-dimensional conversion block. Since a small number of bits are used to express the coefficients when the first bit depth is small, a small first bit depth is translated into a high compression rate.

Hence, if the quantization adjustment value is raised, thereby making the first bit depth smaller, the compression rate can be raised. However, image quality may be degraded due to the raised compression rate. Conversely, if the quantization adjustment value is lowered, thereby making the first bit depth larger, the compression rate can be lowered.

If the need for adjusting the compression rate of the one-dimensional conversion block is not identified, bit streams for coefficients of the first region are generated according to the determined division mode and second bit depth (operation 24). For example, if a predetermined range of coefficients of the first region is "−4 through 3" as shown in Table 1 and a division mode determined in operation 16 is the second division mode, the second bit depth is determined as "3 bits" as shown in Table 1.

FIG. 7B is an example of the second division mode. If bit streams of coefficients of the first region are generated according to the second bit depth, a bit stream of coefficient "00" according to the second bit depth is "000" and bit streams of two coefficients "1" according to the second bit depth are "001," respectively.

If all of the coefficients of the one-dimensional conversion block are "0," bit streams are generated only for identification information of a division mode. For example, referring to FIG. 7A, when the type of division mode is the first division mode, all of coefficients of the one-dimensional conversion block are "0." In the case of the first division mode in which all of the coefficients of the one-dimensional conversion block are "0," a bit stream is generated only for "0" corresponding to the identification information of the first division mode and bit streams for converted/quantized coefficients are not generated.

When the type of mode is divided into three modes, each mode can be expressed using 2 bits. Therefore, a bit stream for "0," which is the identification information of the first division mode, is "00."

Also, if the number of bits required to generate bit streams for coefficients of the first region is greater than or equal to the number of bits required to generate bit streams for pixel values of a one-dimensional block, the bit streams for the pixel values of the one-dimensional block are generated. For example, when an 8×1 block before being converted/quantized has pixel values having a bit depth of 8 bits, if bit streams for the pixel values of the 8×1 block are generated without compressing the pixel values, the total number of bits is "8×8=64 bits." Therefore, when the total number of bits of the coefficients of the first region, which will be generated according to the first bit depth or the second bit depth, is 64 bits or greater, the bit streams for converted/quantized coefficients are not generated, and the bit streams for the pixel values of the one-dimensional block before being converted/quantized are generated.

Since operation 18 of FIG. 1 is not necessarily required in the present embodiment, operation 18 may be omitted. If operation 18 is omitted, bit streams for the coefficients of the first region are generated according to the determined division mode and first bit depth in operation 24 of FIG. 1. If operation 18 is not omitted, when the second flag information is set but the second bit depth is not set, bit streams for the coefficients of the first region are also generated according to the determined division mode and first bit depth in operation 24. For example, it is assumed that the predetermined range of the coefficients of the first region is "−4 through 3" as shown in Table 1 and that a division mode determined in operation 16 is the second division mode.

FIG. 7C is another example of the second division mode. Referring to FIG. 7C, it can be seen that second flag information indicating that not all of the coefficients of the first region are within the predetermined range of "−4 through 3" is set in operation 18. If the second flag information is set in operation 18 and the second bit depth is not determined, bit streams for the coefficients of the first region are generated according to the predetermined first bit depth (for example, 9 bits).

Bit streams for coefficients of a one-dimensional conversion block may be generated using a variable length coding method. In the variable length coding method, short bit streams are generated for coefficients that occur in high probability and long bit streams are generated for coefficients that occur in low probability.

In particular, when generating bit streams for coefficients of the first region, the coefficients of the first region are divided into a first coefficient and the remaining coefficients and then bit streams are generated using the variable length coding method.

For example, when the first coefficient of the first region is "0" as shown in FIG. 7B, the first coefficient is encoded into "0." Also, when an absolute value of the first coefficient of the first region is "1," the first coefficient is encoded into "10."

However, if the absolute value of the first coefficient of the first region is "0" nor "1," the first coefficient is encoded into "11," a bit stream for the first coefficient is generated according to the determined division mode and the first or second bit depth, and the bit stream is added behind "11."

Also, when absolute values of the coefficients excluding the first coefficient of the first region are "1," the coefficients are encoded into "0." When the absolute values of the coefficients excluding the first coefficient of the first region are "0," the coefficients are encoded into "10." However, if the absolute values of the coefficients excluding the first coefficient of the first region are "0" nor "1," the coefficients are encoded into "11," bit streams for the coefficients excluding the first coefficient of the first region are generated according to the determined division mode and the first or second bit depth, and the bit stream is added behind "11."

Here, "+ (positive sign)" is encoded into "0" and "− (negative sign)" is encoded into "1" in order to encode "+ (positive sign" and − (negative sign)" of coefficients of the first region, and "0" and "1" are added to the encoded bit streams of the coefficients.

Bit streams for identification information of a prediction direction mode may be generated using the variable length coding method. For example, if each spatial prediction direction is defined as a prediction direction mode, a vertical prediction direction mode may be encoded into "0", a right diagonal prediction direction mode may be encoded into "10," and a left diagonal prediction direction mode may be encoded into "11."

Generating bit streams for coefficients of the first region or prediction direction modes using the variable length coding method described above is just an example. Bit streams for the coefficients of the first region may be generated using diverse methods.

Figure 9:
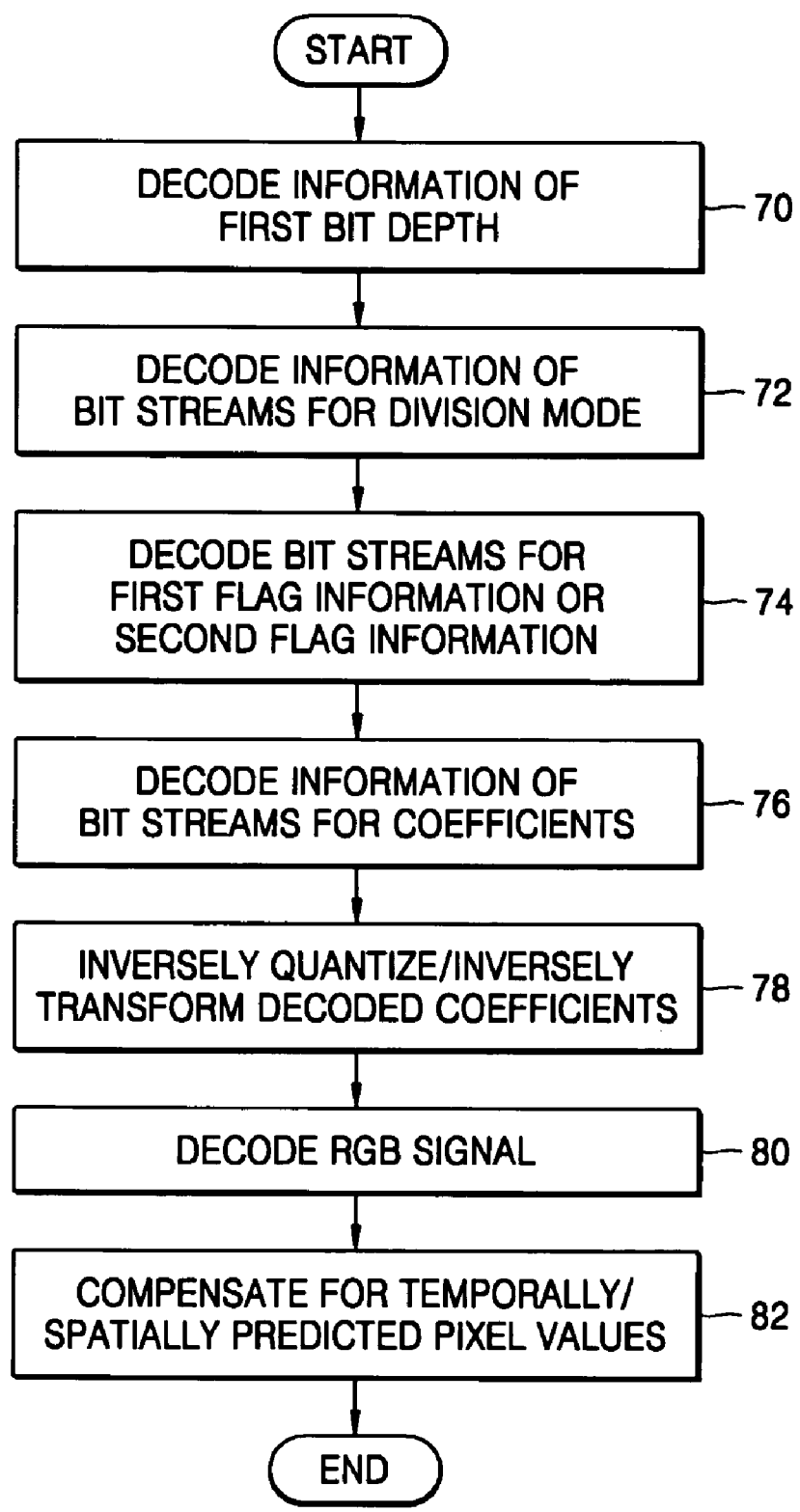
FIG. 9 is a flowchart illustrating a method of decoding image data according to an embodiment of the present invention.

A method of decoding image data according to an embodiment of the present invention will now be described with reference to the attached drawings. FIG. 9 is a flowchart illustrating a method of decoding image data according to this embodiment.

When a one-dimensional block having pixel values transformed/quantized is defined as a one-dimensional conversion block, information of the first bit depth indicating the number of bits used to binarize coefficients of the one-dimensional conversion block is decoded (operation 70). For example, if the first bit depth predetermined or reset in the encoding process has information indicating "9 bits," the information indicating that the first bit depth is "9 bits" is decoded.

After operation 70, information of bit streams for the division mode dividing the one-dimensional conversion block into the first region where at least one of the coefficients of the one-dimensional conversion block is not "0" and the second region where all of the coefficients of the one-dimensional conversion block are "0" is decoded (operation 72).

After operation 72, bit streams for the first flag information indicating that all of coefficients of the first region are within a predetermined range or bit streams for the second flag information indicating that at least one of the coefficients of the first region is not within the predetermined range is decoded (operation 74). For example, in the second division mode of FIG. 7B, all of the coefficients of the first region are within the predetermined range of "−4 through 3" shown in Table 1. Thus, the bit streams for the first flag information are generated for the second division mode in the encoding process. The first flag information for the second division is decoded.

Also, in the second division mode of FIG. 7C, at least one of the coefficients of the first region is not within the predetermined range of "−4 through 3" as shown in Table 1. Thus, bit streams of the second flag information for the second division mode are generated in the encoding process. Accordingly, the second flag information for the second division mode is decoded.

Referring to FIG. 9, after operation 74, information of the bit streams for the coefficients of the one-dimensional conversion block is decoded (operation 76). For example, "000," "001," and "001," which are bit streams for the coefficients of the first region of FIG. 7B, respectively, are sequentially decoded. In particular, if the bit streams for the coefficients of the one-dimensional conversion block are generated using the variable length coding method, the coefficients of the one-dimensional conversion block are decoded as a reverse process of the variable length coding method.

After operation 76, the coefficients of the one-dimensional conversion block are inversely quantized/inversely transformed (operation 78). The inverse quantization/inverse transform of the coefficients of the one-dimensional conversion block is performed as a reverse process of the transform/quantization process. In particular, the transformed coefficients of the one-dimensional conversion block are inversely transformed using the Hadamard transform method.

After operation 78, an RGB signal of the inversely quantized/inversely transformed block is decoded (operation 80).

After operation 80, spatially predicted pixel values of the inversely quantized/inversely transformed block having the decoded RGB signal are compensated for (operation 82). In particular, the spatially predicted pixel values of the one-dimensional block are compensated for using only pixel values of blocks in the above row where the one-dimensional block is.

An apparatus for encoding image data according to an embodiment of the present invention will now be described with reference to the attached drawings.

Figure 10:
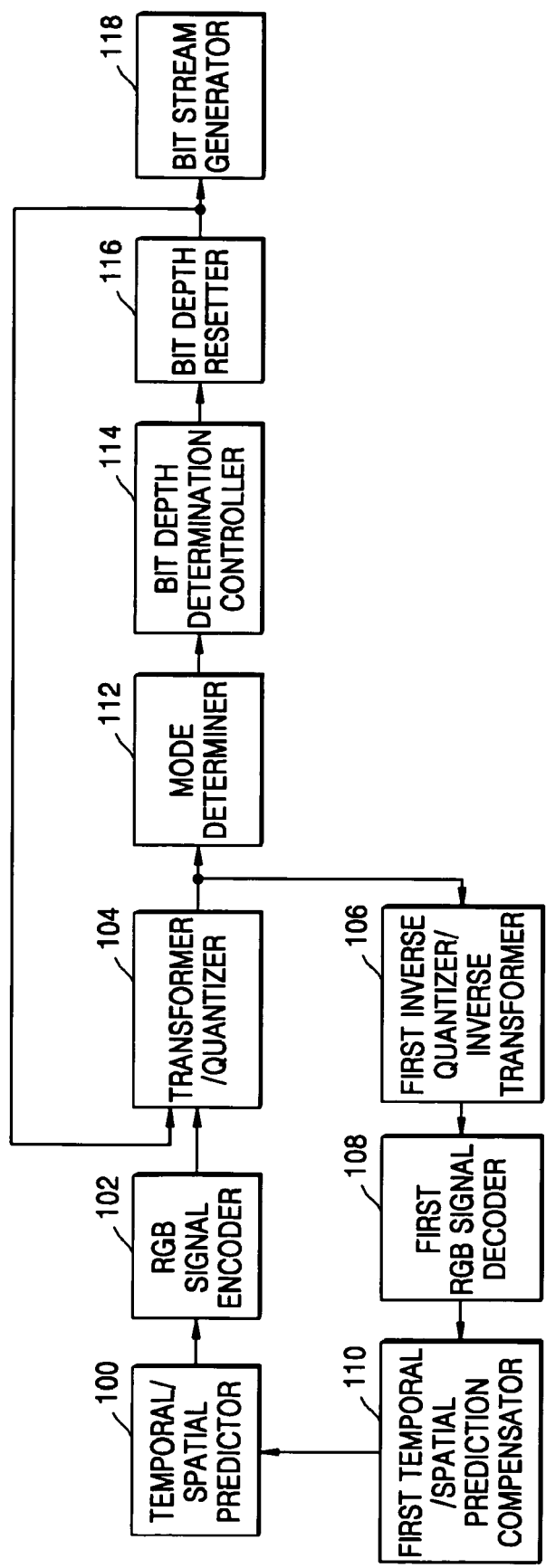
FIG. 10 is a block diagram of an apparatus for encoding image data according to an embodiment of the present invention.

FIG. 10 is a block diagram of an apparatus for encoding image data according to the embodiment. Referring to FIG. 10, the apparatus includes a temporal/spatial predictor 100, an RGB signal encoder 102, a transformer/quantizer 104, a first inverse quantizer/inverse transformer 106, a first RGB signal decoder 108, a first temporal/spatial prediction compensator 110, a mode determiner 112, a bit depth determination controller 114, a bit depth resetter 116, and a bit stream generator 118.

The temporal/spatial predictor 100 spatially predicts pixel values of a one-dimensional block using blocks adjacent to the one-dimensional block or temporally predicts pixel values of a one-dimensional block using a temporally previous frame and outputs the spatially or temporally predicted pixel values to the RGB signal encoder 102. The temporal/spatial predictor 100 removes spatial redundancy between a current one-dimensional block and its adjacent blocks using the result of spatial/temporal prediction compensation output from the first temporal/spatial prediction compensator 110, that is, using restored blocks in a current image. Alternatively, the temporal/spatial predictor 100 removes temporal redundancy between a current image and a previous image.

As shown in FIGS. 2A and 2B, the 8×1 one-dimensional block and the 4×1 one-dimensional block are obtained by dividing image data, which is input in line units, in 8 pixel units and 4 pixel units, respectively. The image data input in line units may also be divided into one-dimensional blocks in various pixel units.

In particular, the temporal/spatial predictor 100 spatially predicts a one-dimensional block using only pixel values of blocks in a row above a row where the one-dimensional block is.

Figure 11:
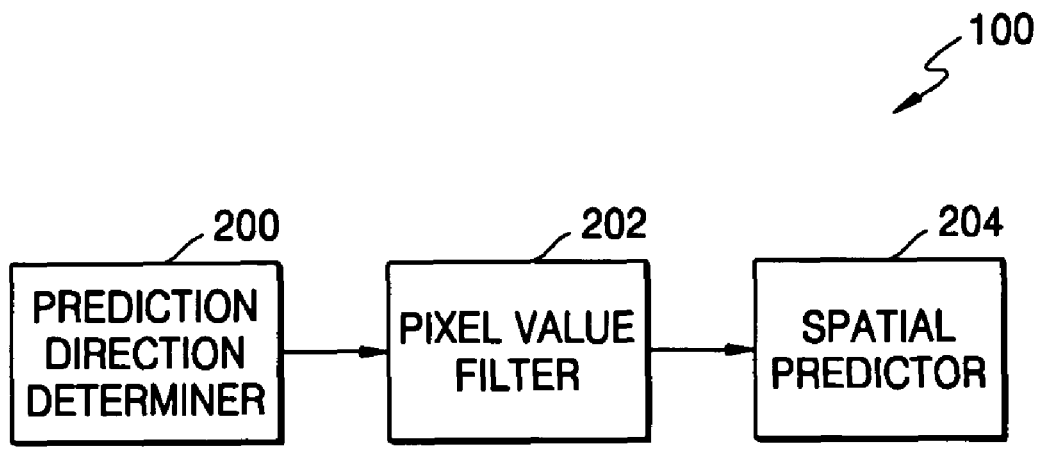
FIG. 11 is a detailed block diagram of a temporal/spatial predictor of FIG. 10 according to an embodiment of the present invention.

FIG. 11 is a detailed block diagram of the temporal/spatial predictor 100 of FIG. 10 according to an embodiment of the present invention. Referring to FIG. 11, the temporal/spatial predictor 100 includes a prediction direction determiner 200, a pixel value filter 202, and a spatial predictor 204.

The prediction direction determiner 200 determines a spatial prediction direction using pixel values of blocks in a row above a row where a one-dimensional block is and outputs the determined spatial prediction direction to the pixel value filter 202. A spatial prediction direction may be a vertical direction, a right diagonal direction, or a left diagonal direction. In particular, the prediction direction determiner 200 calculates sums of differences between pixel values of a one-dimensional block and pixel values of blocks in a row above a row where the one-dimensional block is for the respective R, G and B components and determines a prediction direction having a minimum sum among sums of the sums of the differences for the R, G and B components as a spatial prediction direction. Since the methods of determining the spatial prediction direction have been described above, their detailed descriptions will be omitted.

The pixel value filter 202 filters the pixel values of the blocks in the above row where the one-dimensional block is and outputs the filtered pixel values to the spatial predictor 204. Such filtering is required to prevent degradation of image quality caused by the spatial prediction performed using only the pixel values of the blocks in the above row where the one-dimensional block is. The method of filtering pixel values of blocks in a row above a row where a one-dimensional block is has been described above, and thus its detailed description will be omitted.

The spatial predictor 204 spatially predicts the pixel values of the one-dimensional block using only the pixel values of the blocks in the above row where the one-dimensional block is. The pixel values of the one-dimensional block are spatially predicted in a direction determined by the prediction direction determiner 200 as the spatial prediction direction among the vertical direction, the right diagonal direction, and the left diagonal direction. Since the methods of determining the spatial prediction direction have been described above, their detailed descriptions will be omitted.

Referring to FIG. 1, the RGB signal encoder 102 removes redundant information from the spatially predicted pixel values of the one-dimensional block for each of the R, G and B components in response to the result of temporal/spatial prediction of the one-dimensional block, encode an RGB signal having the redundant information removed, and outputs the encoded RGB signal to the transformer/quantizer 104. The RGB signal encoder 102 removes redundant information using the correlation between the spatially predicted pixel values for each of the R, G and B components and encodes an RGB signal without the redundant information.

The transformer/quantizer 104 transforms/quantizes the pixel values of the one-dimensional block and outputs the transformed/quantized spatially predicted pixel values to the first inverse quantizer/inverse transformer 106 and the mode determiner 112. The transformer/quantizer 104 uses the Hadamard transform, which is one kind of the orthogonal transform encoding method.

The first inverse quantizer/inverse transformer 106 receives the transformed/quantized spatially predicted pixel values from the transformer/quantizer 104, inversely quantizes/inversely transforms transformed/quantized coefficients of a one-dimensional conversion block, and outputs the inversely quantized/inversely transformed coefficients to the first RGB signal decoder 108.

The first RGB signal decoder 108 receives the inversely quantized/inversely transformed coefficients from the first inverse quantizer/inverse transformer 106, decodes an RGB signal of the one-dimensional conversion block, and outputs the decoded RGB signal to the first temporal/spatial prediction compensator 110.

The first temporal/spatial prediction compensator 110 receives the decoded RGB signal from the first RGB signal decoder 108, compensates for the spatially predicted pixel values of the one-dimensional conversion block or the temporally predicted pixel values of the one-dimensional conversion block, and outputs the compensated spatially or temporally predicted pixel values of the one-dimensional conversion block to the temporal/spatial predictor 100.

The mode determiner 112 determines a division mode for dividing the one-dimensional conversion block into the first region where at least one of the coefficients of the one-dimensional conversion block is not "0" and the second region where all of the coefficients are "0." The mode determiner 112 outputs the result of determination to the bit depth determination controller 114. For example, the mode determiner 114 determines a division mode in which all of the coefficients of the second region of the one-dimensional conversion block are "0" among the first through third division modes.

The bit depth determination controller 114 receives a division mode determined by the mode determiner 112 and determines the second bit depth indicating the number of bits used to binarize coefficients of the first region, based on whether all of the coefficients of the first region are within a predetermined range. Then, the bit depth determination controller 114 outputs the determined second bit depth to the bit depth resetter 116.

The bit depth determination controller 114 stores information needed to determine the second bit depth in a memory. The information may be a lookup table like Table 1.

Figure 12:
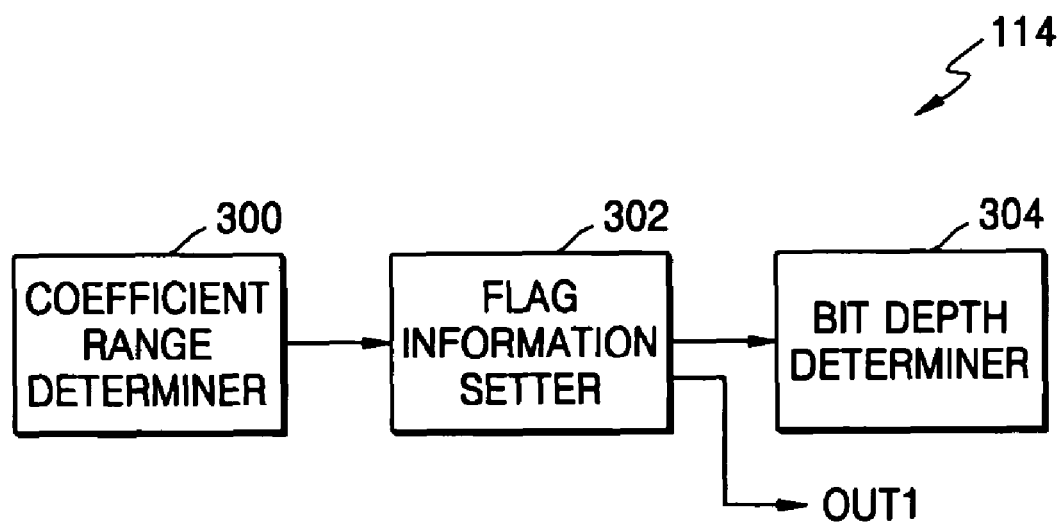
FIG. 12 is a block diagram of a bit depth determination controller of FIG. 10 according to an embodiment of the present invention.

FIG. 12 is a block diagram of the bit depth determination controller 114 of FIG. 10 according to an embodiment of the present invention. Referring to FIG. 12, the bit depth determination controller 114 includes a coefficient range determiner 300, a flag information setter 302, and a bit depth determiner 304.

The coefficient range determiner 300 determines whether all of coefficients of the first region are within a predetermined range and outputs the result of determination to the flag information setter 302.

The flag information setter 302 sets the first flag information indicating that all of the coefficients of the first region are within the predetermined range, in response to the result of determination made by the coefficient range determiner 300 and outputs the first flag information to the bit depth determiner 304.

The flag information setter 302 sets the second flag information indicating that at least one of the coefficients of the first region is not within a predetermined range and outputs the second flag information to the bit depth resetter 116 via an output node OUT1.

The bit depth determiner 304 determines the second bit depth in response to the first flag information set by the flag information setter 302 and outputs the determined second bit depth to the bit depth resetter 116 of FIG. 1.

The bit depth determiner 304 also determines the second bit depth according to the type of division mode. The bit depth determiner 304 may also determine a specific bit depth as the second bit depth regardless of the type of division mode.

Referring to FIG. 10, the bit depth resetter 116 identifies a need for adjusting a compression rate of the one-dimensional conversion block, in response to the second bit depth determined by the bit depth determination controller 114. If the bit depth resetter 116 identifies the need for adjusting the compression rate of the one-dimensional conversion block, the bit depth resetter 116 resets the first bit depth and outputs the reset first bit depth to the transformer/quantizer 104. The first bit depth denotes the number of bits used to binarize coefficients of a one-dimensional conversion block. The bit depth resetter 116 resets the first bit depth using a quantization adjustment value for adjusting a quantization interval. If the bit depth resetter 116 does not identify the need for adjusting the compression rate, the bit depth resetter 116 outputs the determined division mode and second bit depth to the bit stream generator 118.

The bit stream generator 118 generates bit streams for coefficients of the first region according to the determined division mode and second bit depth received from the bit depth resetter 116.

If all of the coefficients of the one-dimensional conversion block are "0," the bit stream generator 118 generates a bit stream only for identification information of a division mode.

If the number of bits required to generate bit streams for coefficients of the first region is greater than or equal to the number of bits required to generate bit streams for pixel values of a one-dimensional block, the bit stream generator 118 generates the bit streams for the pixel values of the one-dimensional block.

The bit stream generator 118 may generate bit streams for the coefficients of the first region according to the second bit depth. However, when the second bit depth is not set, the bit stream generator 118 generates bit streams for the coefficients of the first region according to the first bit depth.

The bit stream generator 118 may generate bit streams for the coefficients of the one-dimensional conversion block using the variable length coding method. In the variable length coding method, short bit streams are generated for coefficients that occur in high probability and long bit streams are generated for coefficients that occur in low probability.

In particular, when generating bit streams for the coefficients of the first region, the bit stream generator 118 divides the coefficients of the first region into the first coefficient and the remaining coefficients and generates bit streams using the variable length coding method.

Here, the bit stream generator 118 encodes "+ (positive sign)" into "0" and encodes "− (negative sign)" into "1" in order to encode "+ (positive sign" and − (negative sign)" of coefficients of the first region, and adds "0" and "1" to the encoded bit streams of the coefficients.

The bit stream generator 118 may generate bit streams for identification information of a prediction direction mode using the variable length coding method. For example, if each spatial prediction direction is defined as a prediction direction mode, the bit stream generator 118 may encode a vertical prediction direction mode into "0", a right diagonal prediction direction mode into "10," and a left diagonal prediction direction mode into "11."

Generating bit streams for coefficients of the first region or prediction direction modes using the variable length coding method described above is just an example. Bit streams for the coefficients of the first region may be generated using diverse methods.

An apparatus for decoding image data according to an embodiment of the present invention will now be described with reference to the attached drawings.

Figure 13:
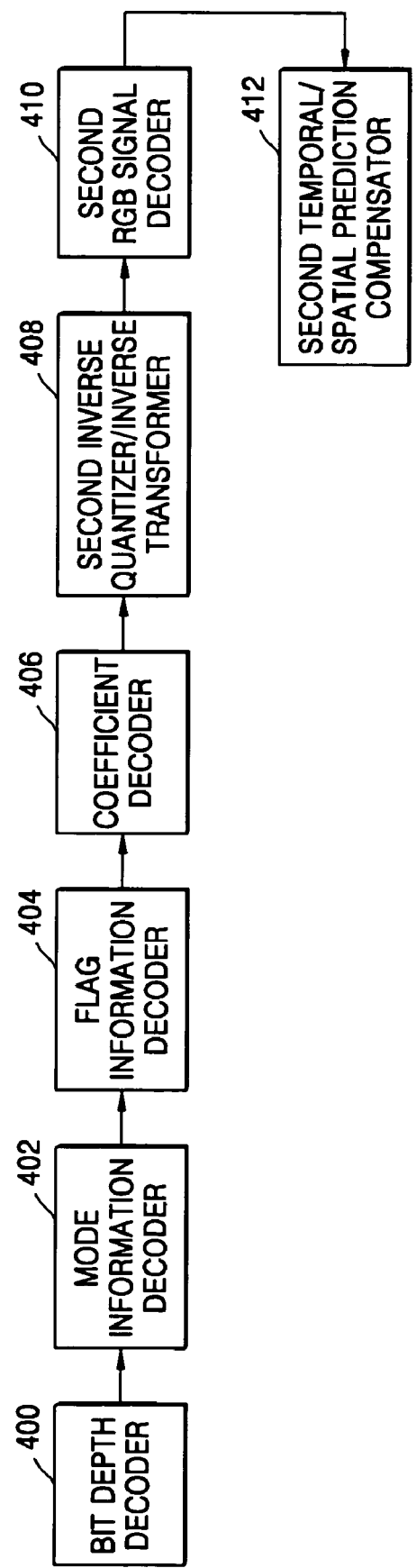
FIG. 13 is a block diagram of an apparatus for decoding image data according to an embodiment of the present invention.

FIG. 13 is a block diagram of an apparatus for decoding image data according to this embodiment. The apparatus includes a bit depth decoder 400, a mode decoder 402, a flag information decoder 404, a coefficient decoder 406, a second inverse quantizer/inverse transformer 408, a second RGB signal decoder 410, a second temporal/spatial prediction compensator 412.

The bit depth decoder 400 decodes information of the first bit depth indicating the number of bits used to binarize coefficients of the one-dimensional conversion block and outputs the decoded information to the mode decoder 402. For example, if the first bit depth predetermined or reset in the encoding process has information indicating "9 bits," the bit depth decoder 400 decodes the information indicating that the first bit depth is "9 bits."

In response to the decoded information of the first bit depth received from the bit depth decoder 400, the mode decoder 402 decodes information regarding a bit stream for a division mode dividing the one-dimensional conversion block into the first region where at least one of coefficients of the one-dimensional conversion block is not "0" and the second region where all of the coefficients are "0," and outputs the decoded information to the flag information decoder 404.

After receiving the decoded information of the division mode from the mode decoder 402, the flag information decoder 404 decodes the bit stream for the first flag information indicating that all of the coefficients of the first region are within a predetermined range or a bit stream for the second flag information indicating that at least one of the coefficients of the first region is not within the predetermined range and outputs the decoded bit stream to the coefficient decoder 406.

The coefficient decoder 406 receives decoded first or second flag information from the flag information decoder 304, decodes information of the bit streams for the coefficients of the one-dimensional conversion block, and outputs the decoded information to the second inverse quantizer/inverse transformer 308.

In particular, if bit streams for the coefficients of the one-dimensional conversion block are generated using the variable length coding method, the coefficient decoder 406 decodes the coefficients of the one-dimensional conversion block in a reverse process of the variable length coding method.

The second inverse quantizer/inverse transformer 408 inversely quantizes/inversely transforms the coefficients of the one-dimensional conversion block received from the coefficient decoder 306 and outputs the inversely quantized/inversely transformed coefficients of the one-dimensional conversion block to the second RGB signal decoder 310. In particular, the second inverse quantizer/inverse transformer 408 inversely transforms the transformed coefficients of the one-dimensional conversion block using the Hadamard transform method.

The second RGB signal decoder 410 receives the inversely quantized/inversely transformed coefficients from the second inverse quantizer/inverse transformer 408, decodes an RGB signal of the inversely quantized/inversely transformed block, and outputs the RGB signal to the second temporal/spatial prediction compensator 412.

The second temporal/spatial prediction compensator 412 receives the decoded RGB signal from the second RGB signal decoder 410 and compensates for the spatially or temporally predicted pixel values of the inversely quantized/inversely transformed block having the decoded RGB signal. In particular, the second temporal/spatial prediction compensator 412 compensates for the spatially predicted pixel values of the one-dimensional block using only the pixel values of the blocks in the above row where the one-dimensional block is.

According to the above-described embodiments of the present invention, a method and apparatus for encoding and decoding image data respectively encode and decode image data in line units. Thus, real-time encoding and decoding of the image data can be easily performed.

In addition, according to the above-described embodiments of the present invention, the method and apparatus enhance compression efficiency while minimizing visual degradation of image quality.

According to the above-described embodiments of the present invention the method and apparatus can also be easily implemented in hardware.

Reference will now be made in detail to an embodiment of the present invention, examples of which are illustrated in the accompanying drawings, wherein like reference numerals refer to the like elements throughout. The embodiment is described below in order to explain the present invention by referring to the figures.

What is claimed is:

1. A method, performed by an image data encoding apparatus including a memory, of encoding image data, the method comprising:
using at least one non-transitory hardware device spatially predicting pixel values of a one-dimensional block of an image received by the image data encoding apparatus using blocks spatially adjacent to the one-dimensional block or temporally predicting the pixel values of the one-dimensional block using a temporally previous frame when image data is input in line units;
transforming and quantizing the pixel values of the one-dimensional block; and
generating bit streams for a one-dimensional conversion block when the transformed and quantized one-dimensional block is defined as the one-dimensional conversion block,
wherein the spatially or temporally predicting comprises:
determining a spatial prediction direction using pixel values of blocks in a row above a row where the one-dimensional block is;
filtering the pixel values of the blocks in the above row where the one-dimensional block is, and
spatially predicting the pixel values of the one-dimensional block using only the blocks in the above row where the one-dimensional block is;
wherein, in the determining a spatial prediction direction, a sum of differences between the pixel values of the one-dimensional block and the pixel values of the blocks in the above row where the one-dimensional block exists is calculated for each of R, G, and B components and a prediction direction having a minimum sum among sums of the sums of the differences for the R, G, and B components is determined as the spatial prediction direction.

2. The method of claim 1, wherein, when each spatial prediction direction is identified as a prediction direction mode, in the generating bit streams, bit streams for identification information of the prediction direction mode are generated using a variable length coding method.

3. The method of claim 1, wherein, in the transforming and quantizing, the pixel values of the one-dimensional block are transformed using a Hadamard transform method.

4. The method of claim 1, further comprising encoding an RGB signal without the redundant information after the spatial or temporal predicting and performing the transforming and quantizing,
wherein the redundant information is removed from R, G, and B pixel values of the one-dimensional block by the spatial or temporal predicting.

5. The method of claim 1, further comprising determining a division mode for dividing the one-dimensional conversion block into a first region where at least one of coefficients of the one-dimensional conversion block is not "0" and a second region where all of the coefficients of the one-dimensional conversion block are "0" after the transforming and quantizing and performing the generating bit streams, and, in the generating bit streams, bit streams for first region coefficients corresponding to coefficients of the first region are generated according to the determined division mode and a first bit depth indicating a number of bits used to binarize the coefficients of the one-dimensional conversion block.

6. The method of claim 5, wherein, in the generating bit streams, bit streams are generated only for identification information of the division mode when all of the coefficients of the one-dimensional conversion block are "0."

7. The method of claim 5, wherein, in the generating bit streams, bit streams for the pixel values of the one-dimensional block are generated when a total number of bits used to generate bit streams for the first region coefficients is greater than or equal to a total number of bits used to generate the bit streams for the pixel values of the one-dimensional block.

8. The method of claim 5, wherein, in the generating bit streams, bit streams for the coefficients of the one-dimensional conversion block are generated using a variable length coding method.

9. The method of claim 8, wherein, in the generating bit streams, the first region coefficients are divided into a first coefficient and coefficients excluding the first coefficient and then bit streams for the first region coefficients are generated using the variable length coding method.

10. The method of claim 5, further comprising:
identifying a need for adjusting a compression rate of the one-dimensional block after the transforming and quantizing; and
resetting the first bit depth when the need for adjusting the compression rate of the one-dimensional block is identified and performing the spatial or temporal predicting.

11. The method of claim 5, further comprising determining a second bit depth indicating a number of bits used to binarize the first region coefficients according to whether all of the first region coefficients are within a predetermined range after the determining a division mode.

12. A method, performed by an image data encoding apparatus including a memory, of encoding image data, the method comprising:
using at least one non-transitory hardware device spatially predicting pixel values of a one-dimensional block of an image received by the image data encoding apparatus using blocks spatially adjacent to the one-dimensional block or temporally predicting the pixel values of the one-dimensional block using a temporally previous frame when image data is input in line units;
transforming and quantizing the pixel values of the one-dimensional block;
generating bit streams for a one-dimensional conversion block when the transformed and quantized one-dimensional block is defined as the one-dimensional conversion block;
determining a division mode for dividing the one-dimensional conversion block into a first region where at least one of coefficients of the one-dimensional conversion block is not "0" and a second region where all of the coefficients of the one-dimensional conversion block are "0" after the transforming and quantizing and performing the generating bit streams, and, in the generating bit streams, bit streams for first region coefficients corresponding to coefficients of the first region are generated according to the determined division mode and a first bit depth indicating a number of bits used to binarize the coefficients of the one-dimensional conversion block; and determining a second bit depth indicating a number of bits used to binarize the first region coefficients according to whether all of the first region coefficients are within a predetermined range after the determining a division mode and storing information needed to determine the second bit depth in the memory.

13. The method of claim 12, wherein the determining a second bit depth comprises:

determining whether all of the first region coefficients are within the predetermined range;

setting first flag information indicating that all of the first region coefficients are within the predetermined range, if all of the first region coefficients are within the predetermined range;

determining the second bit depth in response to the set first flag information; and setting second flag information indicating that at least one of the first region coefficients is not within the predetermined range, when at least one of the first region coefficients is not within the predetermined range.

14. The method of claim 13, wherein, in the determining the second bit depth in response to the set first flag, the second bit depth is determined according to a type of the division mode.

15. The method of claim 13, wherein, in the determining the second bit depth in response to the set first flag, a specific bit depth is determined as the second bit depth.

16. A method, performed by an image data decoding apparatus including a memory, of decoding image data, the method comprising:

using at least one non-transitory hardware device decoding information of bit streams received by the image data decoding apparatus for coefficients of a one-dimensional conversion block when a converted and quantized one-dimensional block, generated from image data input in line units, is defined as the one-dimensional conversion block;

inversely quantizing and inversely transforming the coefficients of the decoded one-dimensional conversion block;

compensating for spatially or temporally predicted pixel values of the inversely quantized and inversely transformed one-dimensional block;

decoding information of bit streams for a division mode for dividing the one-dimensional conversion block into a first region where at least one of the coefficients of the one-dimensional conversion block is not "0" and a second region where all of the coefficients of the one-dimensional conversion block are "0" and performing the decoding information of bit streams; and decoding bit streams for first flag information indicating that all of first region coefficients corresponding to coefficients of the first region are within a predetermined range or bit streams for second flag information indicating that at least one of the first region coefficients is not within the predetermined range, after the decoding bit streams for a division mode.

17. The method of claim 16, wherein, in the compensating, the spatially predicted pixel values are compensated for using only pixel values of blocks in a row above a row where the one-dimensional block is.

18. The method of claim 16, wherein, in the decoding information of bit streams, the coefficients of the one-dimensional conversion block having the bit streams generated using a variable length coding method are decoded.

19. The method of claim 16, wherein, in the inverse quantizing and transforming, the coefficients of the one-dimensional conversion block are inversely transformed using a Hadamard transform method.

20. The method of claim 16, further comprising decoding a first bit depth indicating a number of bits used to binarize the coefficients of the one-dimensional conversion block and performing the decoding information of bit streams.

21. The method of claim 16, further comprising decoding an RGB signal of the inversely quantized and inversely transformed one-dimensional block, after the inversely quantizing and inversely transforming of the decoded one-dimensional conversion block.

22. A non-transitory hardware apparatus to encode image data, the apparatus comprising:

a memory;

a temporal/spatial predictor spatially predicting pixel values of a one-dimensional block of an image using blocks spatially adjacent to the one-dimensional block or temporally predicting the pixel values of the one-dimensional block using a temporally previous frame when image data is input in line units;

a transformer and quantizer transforming and quantizing the pixel values of the one-dimensional block;

a first inverse quantizer and inverse transformer inversely quantizing and inversely transforming a one-dimensional conversion block when the transformed and quantized one-dimensional block is defined as the one-dimensional conversion block;

a first temporal/spatial prediction compensator compensating for the spatially or temporally predicted pixel values; and a bit stream generator generating bit streams for the one-dimensional conversion block, wherein the temporal/spatial predictor comprises:

a prediction direction determiner determining a spatial prediction direction using pixel values of blocks in a row above where the one-dimensional block is;

a pixel value filter filtering the pixel values of the blocks in the row above where the one-dimensional block is, and a spatial predictor spatially predicting the pixel values of the one-dimensional block using only the blocks in the row above where the one-dimensional block is, wherein the prediction direction determiner calculates a sum of differences between the pixel values of the one-dimensional block and the pixel values of the blocks in the above row where the one-dimensional block exists for each of R, G, and B components and determines a prediction direction having a minimum sum among sums of the sums of the differences for the R, G, and B components as the spatial prediction direction.

23. The apparatus of claim 22, wherein, when each spatial prediction direction is identified as a prediction direction mode, the bit stream generator generates bit streams for identification information of the prediction direction mode by using a variable length coding method.

24. The apparatus of claim 22, wherein the converter and quantizer transforms the pixel values of the one-dimensional block by using a Hadamard transform method.

25. The apparatus of claim 22, further comprising:

an RGB signal encoder removing redundant information from R, G and B pixel values of the one-dimensional block and encoding an R, G and B signal without the redundant information;

a first inverse quantizer and inverse transformer inversely quantizing and inversely transforming the transformed and quantized coefficients; and a first RGB signal decoder decoding the encoded RGB signal of the one-dimensional conversion block.

26. The apparatus of claim 22, further comprising a mode determiner determining a division mode for dividing the one-dimensional conversion block into a first region where at least one of coefficients of the one-dimensional conversion block is not "0" and a second region where all of the coefficients of the one-dimensional conversion block are "0," and the bit stream generator generates bit streams for first region coefficients corresponding to coefficients of the first region according to the determined division mode and a first bit depth indicating a number of bits used to binarize the coefficients of the one-dimensional conversion block.

27. The apparatus of claim 26, wherein the bit stream generator generates bit streams only for identification information of the division mode when all of the coefficients of the one-dimensional conversion block are "0."

28. The apparatus of claim 26, wherein the bit stream generator generates bit streams for the pixel values of the one-dimensional block when a total number of bits used to generate bit streams for the first region coefficients is greater than or equal to a total number of bits used to generate the bit streams for the pixel values of the one-dimensional block.

29. The apparatus of claim 26, wherein the bit stream generator generates bit streams for the coefficients of the one-dimensional conversion block by using a variable length coding method.

30. The apparatus of claim 29, wherein the bit stream generator divides the first region coefficients into a first coefficient and coefficients excluding the first coefficient and then generates bit streams for the first region coefficients by using the variable length coding method.

31. The apparatus of claim 26, further comprising a bit depth resetter resetting the first bit depth.

32. The apparatus of claim 26, further comprising a bit depth determination controller determining a second bit depth indicating a number of bits used to binarize the first region coefficients according to whether all of the first region coefficients are within a predetermined range.

33. A non-transitory hardware apparatus for encoding image data, the apparatus comprising:
   a memory;
   a temporal/spatial predictor spatially predicting pixel values of a one-dimensional block of an image using blocks spatially adjacent to the one-dimensional block or temporally predicting the pixel values of the one-dimensional block using a temporally previous frame when image is input in line units;
   a transformer and quantizer transforming and quantizing the pixel values of the one-dimensional block;
   a first inverse quantizer and inverse transformer inversely quantizing and inversely transforming a one-dimensional conversion block when the transformed and quantized one-dimensional block is defined as the one-dimensional conversion block;
   a first temporal/spatial prediction compensator compensating for the spatially or temporally predicted pixel values;
   a bit stream generator generating bit streams for the one-dimensional conversion block;
   a mode determiner determining a division mode for dividing the one-dimensional conversion block into a first region where at least one of coefficients of the one-dimensional conversion block is not "0" and a second region where all of the coefficients of the one-dimensional conversion block are "0," and the bit stream generator generates bit streams for first region coefficients corresponding to coefficients of the first region according to the determined division mode and a first bit depth indicating a number of bits used to binarize the coefficients of the one-dimensional conversion block; and
   a bit depth determination controller determining a second bit depth indicating a number of bits used to binarize the first region coefficients according to whether all of the first region coefficients are within a predetermined range and storing information needed to determine the second bit depth in the memory.

34. The apparatus of claim 33, wherein the bit depth determination controller comprises:
   a coefficient range determiner determining whether all of the first region coefficients are within the predetermined range;
   a flag information setter setting first flag information indicating that all of the first region coefficients are within the predetermined range or setting second flag information indicating that at least one of the first region coefficients is not within the predetermined range, in response to the result of determination by the coefficient range determiner; and
   a bit depth determiner determining the second bit depth in response to the set first flag information.

35. The apparatus of claim 34, wherein the bit depth determiner determines the second bit depth according to a type of the division mode.

36. The apparatus of claim 34, wherein the bit depth determiner determines a specific bit depth as the second bit depth.

37. A non-transitory hardware apparatus for decoding image data, the apparatus comprising:
   a memory;
   a coefficient decoder decoding information of bit streams for coefficients of a one-dimensional conversion block when a converted and quantized one-dimensional block, generated from image data input in line units, is defined as the one-dimensional conversion block;
   a second inverse quantizer and inverse transformer inversely quantizing and inversely transforming the coefficients of the decoded one-dimensional conversion block; and
   a second temporal/spatial prediction compensator compensating for spatially or temporally predicted pixel values of the inversely quantized and inversely transformed one-dimensional block;
   a mode decoder decoding information of bit streams for a division mode for dividing the one-dimensional conversion block into a first region where at least one of the coefficients of the one-dimensional conversion block is not "0" and a second region where all of the coefficients of the one-dimensional conversion block are "0"; and
   a flag information decoder decoding bit streams for first flag information indicating that all of first region coefficients corresponding to coefficients of the first region are within a predetermined range or bit streams for second flag information indicating that at least one of the first region coefficients is not within the predetermined range.

38. The apparatus of claim 37,
   wherein the second temporal/spatial predication compensator compensates for the spatially predicted pixel values using only pixel values of blocks in a row above a row where the one-dimensional block is.

39. The apparatus of claim 37, wherein the coefficient decoder decodes the coefficients of the one-dimensional conversion block having the bit streams generated using a variable length coding method.

40. The apparatus of claim 37, wherein the second inverse quantizer and inverse transformer inversely transforms the coefficients of the one-dimensional conversion block by using a Hadamard transform method.

41. The apparatus of claim 37, further comprising a bit depth decoder decoding a first bit depth indicating a number of bits used to binarize the coefficients of the one-dimensional conversion block.

42. The apparatus of claim 37, further comprising a second RGB signal decoder decoding an RGB signal of the inversely quantized and inversely transformed one-dimensional block.

* * * * *

UNITED STATES PATENT AND TRADEMARK OFFICE
CERTIFICATE OF CORRECTION

PATENT NO. : 7,995,848 B2  
APPLICATION NO. : 11/302142  
DATED : August 9, 2011  
INVENTOR(S) : Wooshik Kim et al.

Page 1 of 1

It is certified that error appears in the above-identified patent and that said Letters Patent is hereby corrected as shown below:

On the Title page, Item (75) (Inventors), delete "Shinwa", and insert -- Shihwa --, therefor.

Signed and Sealed this  
Fourteenth Day of February, 2012

David J. Kappos  
*Director of the United States Patent and Trademark Office*